United States Patent [19]

Nakamura

[11] Patent Number: 4,775,944

[45] Date of Patent: Oct. 4, 1988

[54] SYSTEM FOR CONTROLLING AIR CONDITIONING AND/OR HOT WATER SUPPLYING APPARATUS

[75] Inventor: Tadao Nakamura, Machida, Japan

[73] Assignee: Matsushita Electric Industrial Co Ltd, Osaka, Japan

[21] Appl. No.: 771,587

[22] Filed: Sep. 3, 1985

[30] Foreign Application Priority Data

Aug. 31, 1984 [JP] Japan ................................ 59-181722

[51] Int. Cl.⁴ ..................... G06F 15/20; G05D 23/00; F24F 3/00
[52] U.S. Cl. ..................................... 364/505; 237/13; 236/91 R; 165/22
[58] Field of Search ....................... 364/505, 483, 464; 165/22, 11.1; 237/12.1, 13; 236/91 R, 51

[56] References Cited

U.S. PATENT DOCUMENTS

| | | | |
|---|---|---|---|
| 1,752,684 | 4/1930 | Mead | 237/13 |
| 2,001,226 | 5/1935 | Viewegh | 237/13 |
| 3,590,910 | 7/1971 | Lorenz | 165/22 |
| 3,838,813 | 10/1974 | Brosenius | 237/13 |
| 4,080,568 | 3/1978 | Funk | 364/464 |
| 4,106,095 | 8/1978 | Yarbrough | 364/464 |
| 4,296,727 | 10/1981 | Bryan | 165/11.1 X |
| 4,319,711 | 3/1982 | Barker et al. | 236/46 R |
| 4,362,270 | 12/1982 | Cleary et al. | 236/51 X |
| 4,420,032 | 12/1983 | Van Koppen et al. | 165/1 |
| 4,420,947 | 12/1983 | Yoshino | 126/422 |
| 4,616,325 | 10/1986 | Heckenbach et al. | 165/22 X |

Primary Examiner—Parshotam S. Lall
Assistant Examiner—Joseph L. Dixon
Attorney, Agent, or Firm—Wenderoth, Lind & Ponack

[57] ABSTRACT

A control system for air conditioning and/or hot water supplying apparatus using a central heat source supplies cooling or heating to a plurality of dwelling units of a congregated or multi-storied house. The system calculates the optimum operating condition of the air conditioning and/or hot water supplying apparatus in each of the dwelling units using the operating state information of the central heat source, the weather information forecasted on the basis of the outdoor weather information, the indoor atmosphere information, and the operating state of the air conditioning and/or hot water supplying apparatus in the dwelling units, and the optimum condition is displayed on an output terminal device in each of the dwelling units.

5 Claims, 3 Drawing Sheets

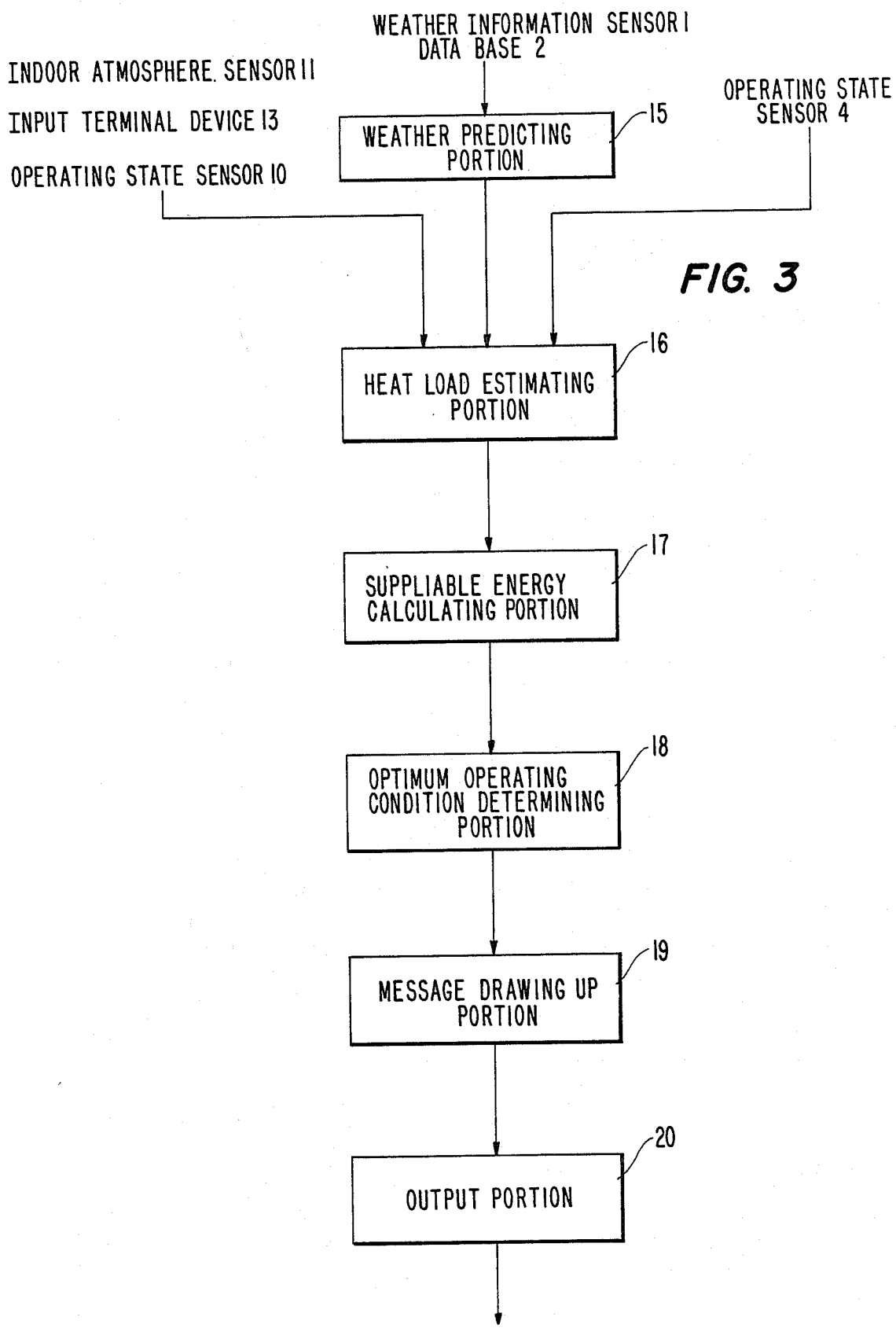

SYSTEM FOR CONTROLLING AIR CONDITIONING AND/OR HOT WATER SUPPLYING APPARATUS

BACKGROUND OF THE INVENTION

The present invention relates to a system for controlling air conditioning and/or hot water supplying apparatus and more particularly, to a system for controlling a central heat source and individual air conditioning and/or hot water supplying apparatus in a congregated house.

Recently, the number of congregated or multistoried houses have greatly increased. Simultaneously, energy demand in this type of house is increased for air conditioning, such as cooling or heating, and hot water supply. In the congregated or multi-storied house, energy consumption in each dwelling unit varies. However, the energy consumption is usually increased abruptly in the evening and at night. Therefore, the energy demand in the congregated or multi-storied house changes significantly during the entire day. Furthermore, the energy demand is different in dependance upon the seasons. For example, electric power consumption is high for air cooling during the summer. This is well known as the summer peak of electric power consumption.

For response to these various demands and load fluctuations, air conditioning equipment and/or hot water supplying equipment are installed individually in each dwelling unit, although it becomes rather expensive.

On the other hand, a centrally controlled system having a central heat source unit for supplying air conditioning and hot water to the individual dwelling units has been considered. In this system, the capacity of the central heat source unit is determined by the peak of energy demand. This requires excessive equipment as compared with average energy demand, which causes large energy losses during low loads in the daytime, and furthermore decreases the running efficiency of the central heat source unit.

SUMMARY OF THE INVENTION

It is therefore an object of the present invention to provide a controlling system for air conditioning and/or hot water supplying apparatus which has properly scaled equipment for use with a central control system.

It is another object of the invention to make the energy load of the centrally controlled system.

It is a further object of the invention to provide a controlling system for the centrally controlled system which allows a flexible response to energy consumption demands from each of the dwelling units.

It is a further object of the present invention to increase the running efficiency of the central heat source unit.

According to the present invention, a system is provided which comprises a central heat source unit, a controller which controls the operating condition of the central heat source unit, an estimation means for estimating the heat load using weather information, the operating condition of central heat source unit and the operating condition of air conditioning and/or hot water supplying apparatus in each dwelling unit, and a means for transmitting messages to each dwelling unit which provide information for making the heat load of the central heat source unit even and for obtaining a desired air conditioning state for each dwelling unit.

BRIEF DESCRIPTION OF THE DRAWINGS

The present invention will be described in further detail with reference to the accompanying drawings in which:

FIG. 3 is a detailed block diagram of an essential part of FIG. 1.

DETAILED DESCRIPTION OF THE INVENTION

Figure 1:
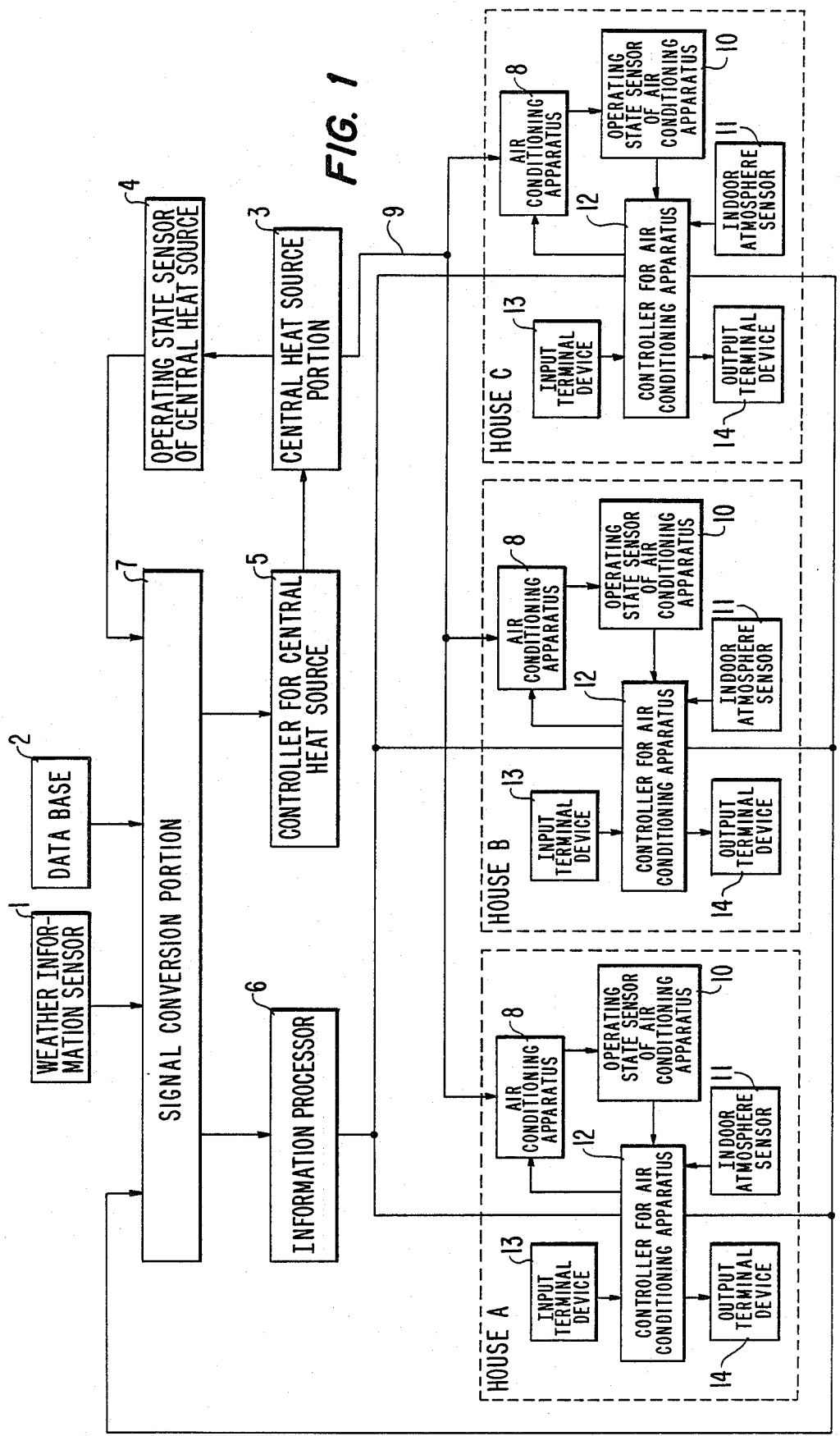
FIG. 1 is a block diagram of a system for controlling air conditioning and/or hot water supplying apparatus according to the embodiment of the present invention.

Referring now to FIG. 1, reference numeral 1 designates a weather information sensor which measures outdoor weather information data such as temperature, the humidity of the air and so on. Reference numeral 2 designates a data base which stores data for forecasting weather or atmospheric phenomena near a congregated or multi-storied house on the basis of the data from the weather information sensor 1. A central heat source 3 supplies heating or cooling to house A, house B, house C, . . . through piping 9. The operating state or condition state sensor 4 and the detected information is supplied to a signal conversion portion 7. The signal conversion portion 7 converts data or information from the weather information sensor 1 the data base 2, the operating state sensor 4, and a controller 12 which is to be explained later into data or information conformed to a controller 5 and an information processor 6. The controller 5 controls the operation of the central heat source 3. The information processor 6 will be discussed later.

Located in each dwelling unit, which is shown in FIG. 1 as house A, house B, and house C each surrounded by a dotted line, is an air conditioning apparatus 8 (which includes a water boiler for supplying hot water to a kitchen, bath and so on), a sensor 10 for monitoring the operation of the air conditioning apparatus 8, an indoor atmosphere sensor 11 for measuring the temperature and humidity of a room, a controller 12 for controlling the air conditioning apparatus 8, an input terminal device 13 such as keyboard for operating the controller 12, and an output terminal device 14 for displaying messages from the information processor 6.

The information processor 6 processes the following three peces of information.

(a) Operating state information obtained by the operating state sensor 4 which monitors the operation of the central heat source 3;

(b) Weather information of the outdoor atmosphere of the congregated or multi-storied house obtained by the weather information sensor 1; and (c) Indoor atmosphere information obtained by the indoor atmosphere sensor 11.

Figure 2:
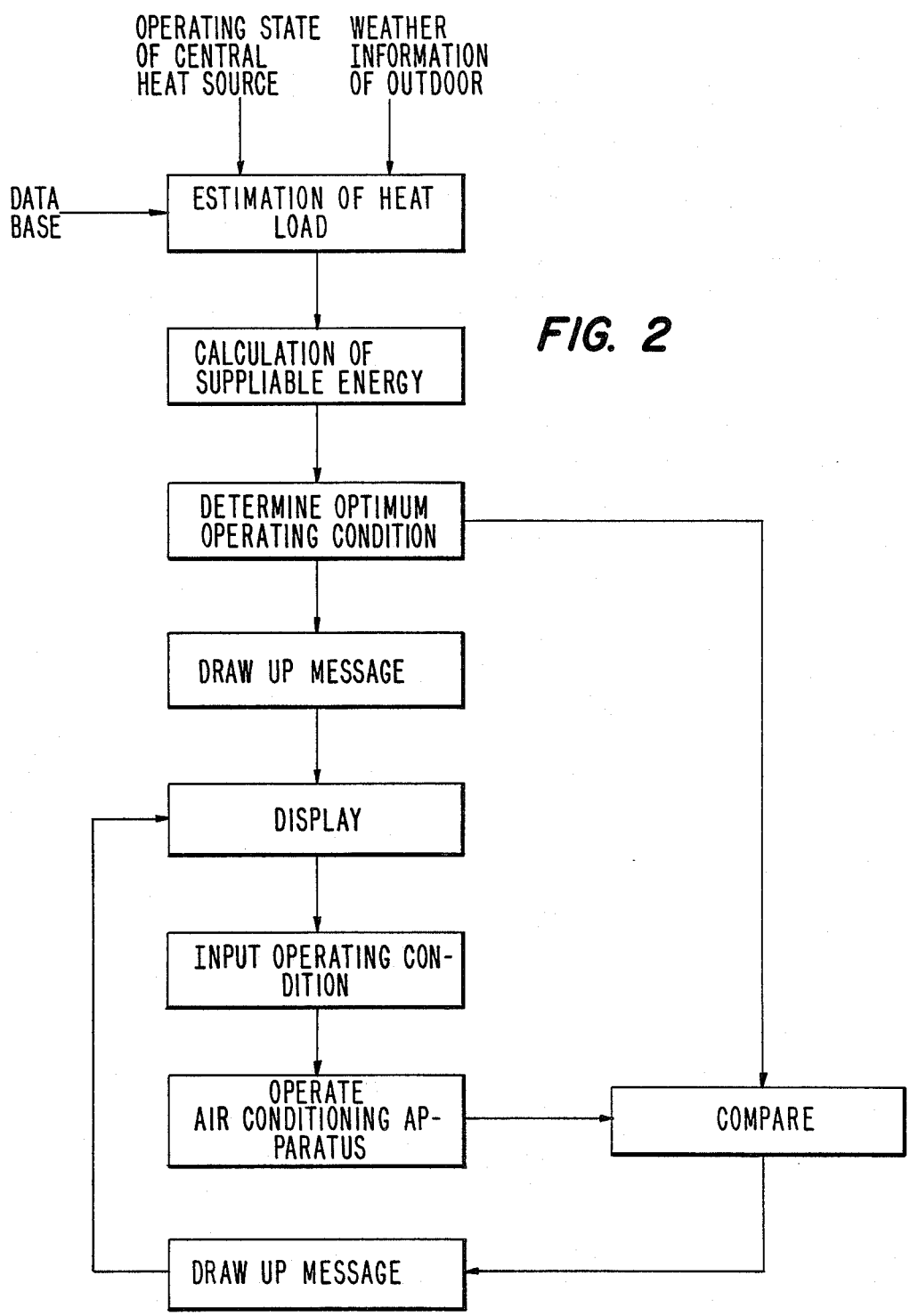
FIG. 2 is a flowchart for explaining the operation of FIG. 1.

Referring to FIG. 2, the information processor 6 estimates the heat load which may be loaded to the central heat source 4 by using the operating state information of the central heat source 4, the weather information of the outdoor, and data from the data base 2. Simultaneously, the signal processor 6 calculates the energy which is suppliable to each air conditioning apparatus 8 from the central heat source 4, and determines the optimum operating condition of the air conditioning apparatus 8 in the dwelling units for making the heat load peak even as much as possible and for saving energy. On the basis of the optimum operating condition, various messages are drawn up, and the messages are transmitted to the output terminal device 14 of each of the dwelling units via the controller 12. The detail of the message will be discussed later.

A consumer can operate the air conditioning apparatus at its optimum operating condition by operating the input terminal device 13 to set the operating condition in obedience to the message displayed on the output terminal device 14. If necessary, the signal processor 6 further draws up a new message for modifying the input instruction by comparing the input instruction with the determined optimum operating condition.

Referring now to FIG. 3, the signal processor 6 will be explained in further detail. A weather predicting portion 15 forecasts the weather of the day on the basis of data and information from the weather information sensor 1 and the data base 2. A heat load estimating portion 16 estimates the total heat load which may be consumed in the dwelling units by using the operating state information from the operating state sensor 4, the forecasted weather information from the weather predicting portion 15, the indoor atmosphere information from the indoor atmosphere sensor 11, the input instruction from the input terminal device 13, and the operating state information of the air conditioning apparatus 8 from the operating state sensor 10.

Then, a suppliable energy calculating portion 17 calculates the required amount of energy in response to the estimated heat load in consideration of the present operating state, the heat storage state, and the capacity of the central heat source. An optimum operating condition determining portion 18 calculates the optimum operating condition of the central heat source 3 in such a manner that it operates within the equipment power capability, without the time peak of heat load, and in saving energy. The calculating optimum operating condition is supplied to a message drawing up portion 19 where various messages for operating the air conditioning apparatus 8 at an optimum operating condition are drawn up. The messages are supplied to the output portion 20 to display the messages on the output terminal device 14.

For the messages, promotional information, incentive information, penalty information, and discouragement information are prepared. The promotional information is an information which teaches a desired or preferable operation. For example, "It is profitable to switch on the cooling operation at 3 p.m. rather than in the evening." or "It is profitable to open the windows rather than using the cooling operation because the outdoor air is dry." is prepared. The incentive information is information which teaches the advantage to the consumer when the consumer cooperates in making the heat load even or saving energy. For example, a message "When you operate your air conditioning apparatus according to the following condition, the power rate will be 5% lower. The condition is . . ." is the incentive information. The discouragement information is information which indicates the irrationality of certain kinds of operation of the air conditioning apparatus or warns not to operate in such a fashion. The penalty information is information which imposes a penalty when certain kinds of operation of the air conditioning is performed. These messages are displayed on the output terminal device simultaneously or selectively.

The signal processor 6 may be formed by both the block circuits and by a microcomputer.

As described above, the present invention provides a system which calculates the optimum operating condition of the air conditioning and/or hot water supplying apparatus using the operating state information of the central heat source, the outdoor weather information, the indoor atmosphere information and consumer's requests, and displays the optimum operating condition on the consumer's display unit. Therefore, the consumer can easily operate the air conditioning and/or hot water supplying apparatus with a comfortable environment and advantages by obeying the displayed message, and which can make the heat load of the central heat source even and save energy.

What is claimed is:

1. A heat supplying system comprising:
    a central heat source unit for supplying a heat to heat available equipment disposed in each occupancy dwelling unit of a congregated house;
    a means for detecting an operating condition of said central heat source unit;
    a means for detecting indoor atmosphere information in each occupancy dwelling unit;
    a means for forecasting a weather environment outside of said congregated house;
    a means for estimating a heat load for the dwelling units by using said detected operating condition of said central heat source unit, said detected indoor atmosphere information, and said forecasted weather information;
    a means for calculating a preferable operating condition of said heat available equipment by calculating data based upon at least said estimated heat load and suppliable energy from said central heat source;
    a means disposed in each occupancy dwelling unit for displaying messages relating to said preferable operating condition obtained by said calculating means; and
    an operation terminal means for controlling said heat available equipment disposed in each occupancy dwelling unit so as to operate in said calculated preferable operating condition in response to said displayed messages.

2. A heat supplying system according to claim 1, wherein said forecasting means comprises: a weather information sensor for detecting weather conditions outside of said congregated house, and a data base for storing data to predict weather and forecasted weather information generating portions on the basis of said weather information from the sensor and weather predicting data from the data base.

3. A heat supplying system according to claim 1, wherein said displayed messages are prepared in accordance with information from all of the residents of the congregated house.

4. A heat supplying system according to claim 1, further comprising a means for detecting an operating condition of said heat available equipment, wherein said calculating means calculates said preferable operating condition by further using said detected operating condition of said heat available equipment.

5. A heat supplying system according to claim 3, wherein said message include at least one of promotional information, incentive information, discouragement information, and penalty information with respect to operating said heat available equipment in said dwelling region.

* * * * *